(12) United States Patent
Waters

(10) Patent No.: US 6,179,250 B1
(45) Date of Patent: Jan. 30, 2001

(54) AIR AND SPACE VEHICLE PROPULSION SYSTEM

(76) Inventor: Laurence Waters, 541 Stone St., Watertown, NY (US) 13601

( * ) Notice: Under 35 U.S.C. 154(b), the term of this patent shall be extended for 0 days.

(21) Appl. No.: 09/247,961

(22) Filed: Feb. 10, 1999

(51) Int. Cl.$^7$ ................................................. B64C 27/00
(52) U.S. Cl. ............................................ 244/62; 244/172
(58) Field of Search ................................. 244/62, 53 R, 244/172, 158 R

(56) References Cited

U.S. PATENT DOCUMENTS

| | | | |
|---|---|---|---|
| 3,095,163 | * 6/1963 | Hill | 244/62 |
| 3,150,363 | 9/1964 | Finvold | 343/59 A |
| 3,151,325 | 9/1964 | Kompfuer | 343/100 AM |
| 3,169,245 | 2/1965 | Cutler | 343/100 ST |
| 3,373,430 | 3/1968 | Croswell et al. | 343/773 |
| 3,495,791 | * 2/1970 | Drell et al. | 244/172 |
| 3,504,868 | * 4/1970 | Engelberger | 244/172 |
| 3,656,166 | 4/1972 | Klopach et al. | 343/773 |
| 3,662,554 | * 5/1972 | De Broqueville | 244/62 |
| 4,253,190 | 2/1981 | Czonka | 244/62 |
| 4,663,932 | * 5/1987 | Cox | 60/200.1 |
| 4,704,732 | 11/1987 | Czonka | 244/62 |
| 5,142,861 | * 9/1992 | Schlicher et al. | 60/203.1 |
| 5,818,649 | * 10/1998 | Anderson | 359/726 |

\* cited by examiner

*Primary Examiner*—J. Woodrow Eldred
(74) *Attorney, Agent, or Firm*—Bernhard P. Molldrem, Jr.

(57) ABSTRACT

A propulsion system for aerospace vehicles employs dipole radiators in an interlayer space between outer and inner layers of the vehicle hull. Microwaves are applied, via a control console, to the radiators. The hull may be configured as sectors, and energy may be applied sector by sector to control levitation and propulsion. The outer hull layer can have a grooved inner surface, and may be formed of a titanium or beryllium alloy.

8 Claims, 4 Drawing Sheets

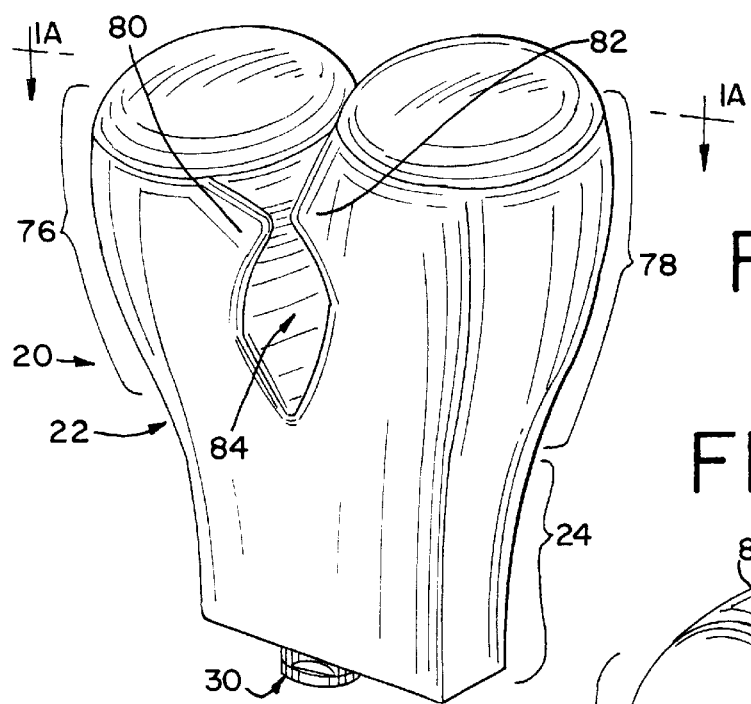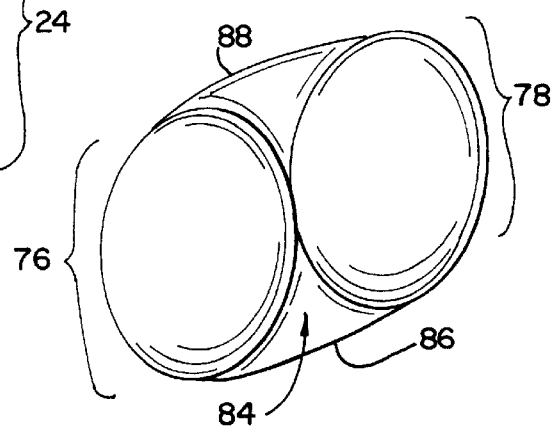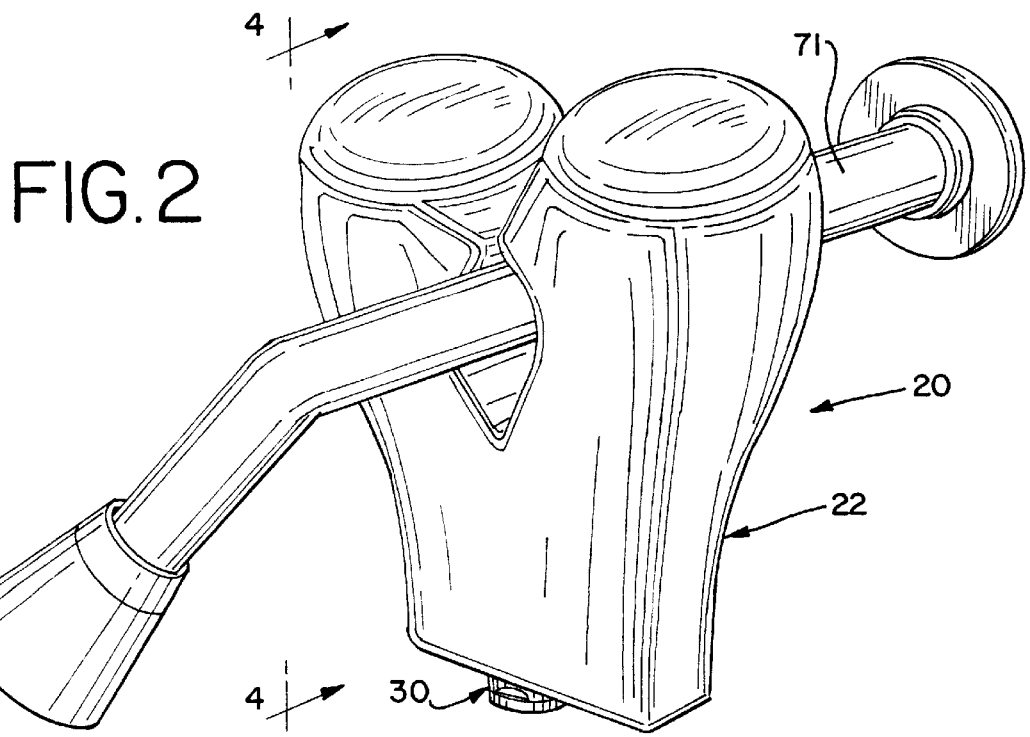

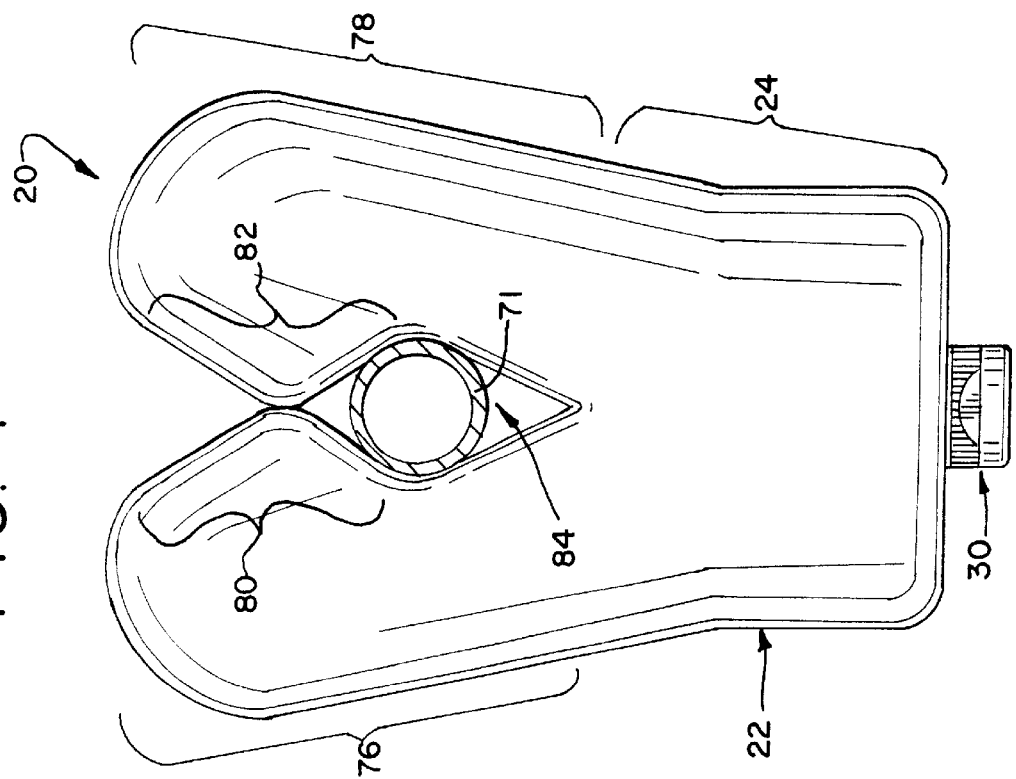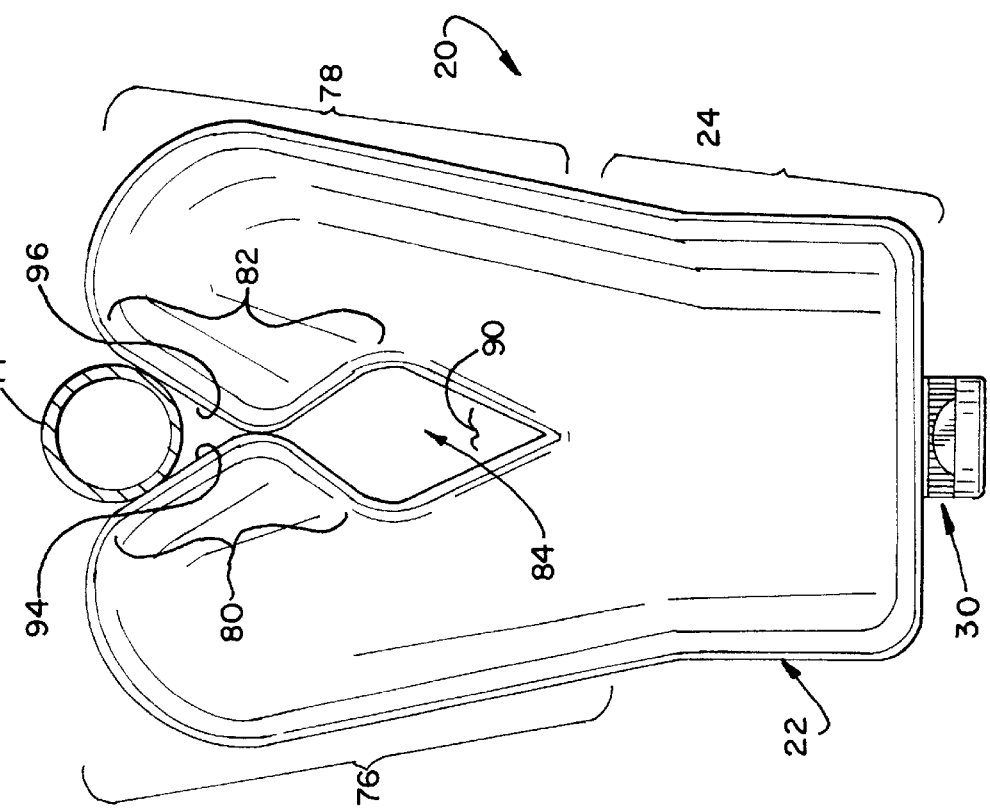

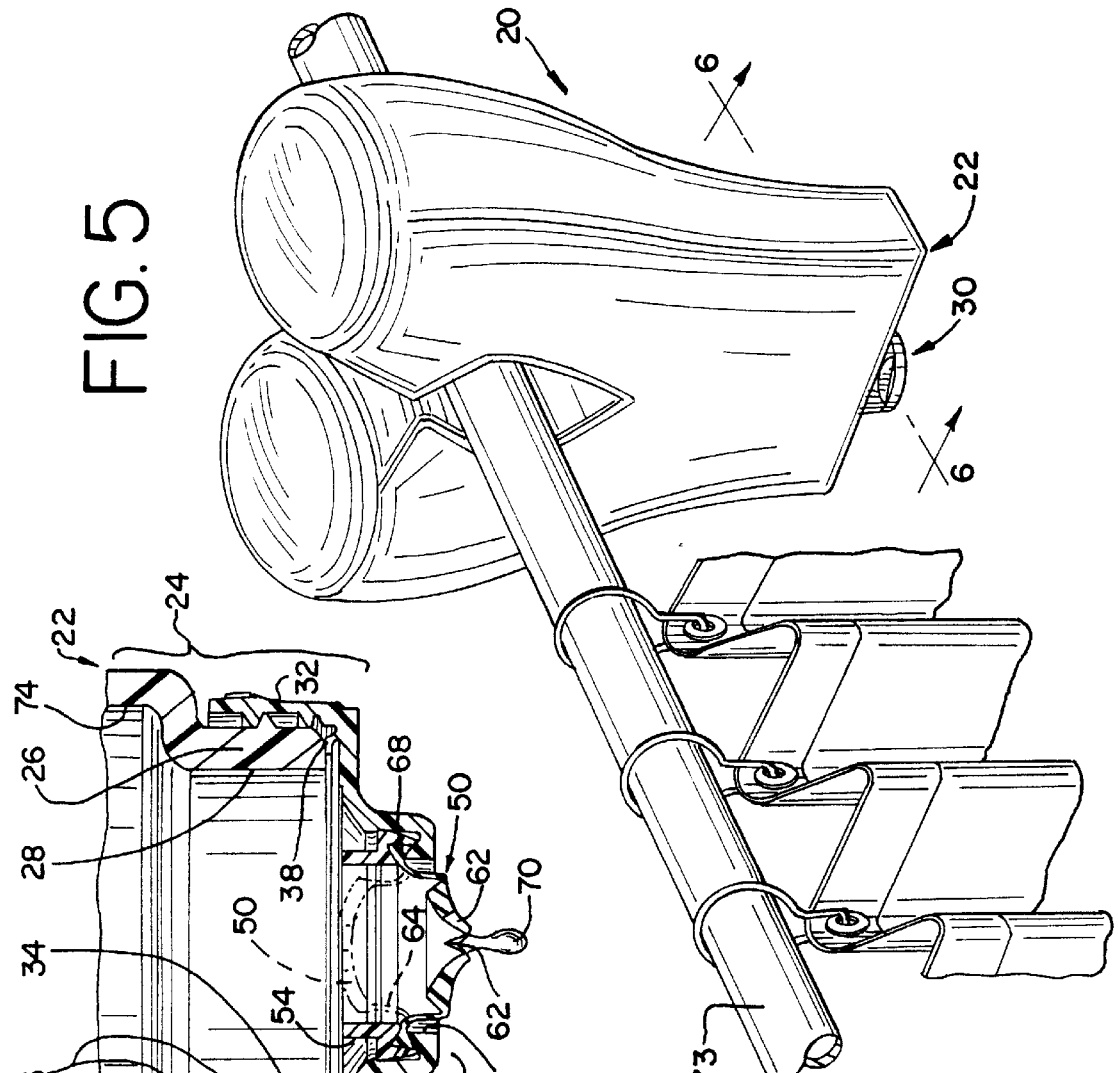
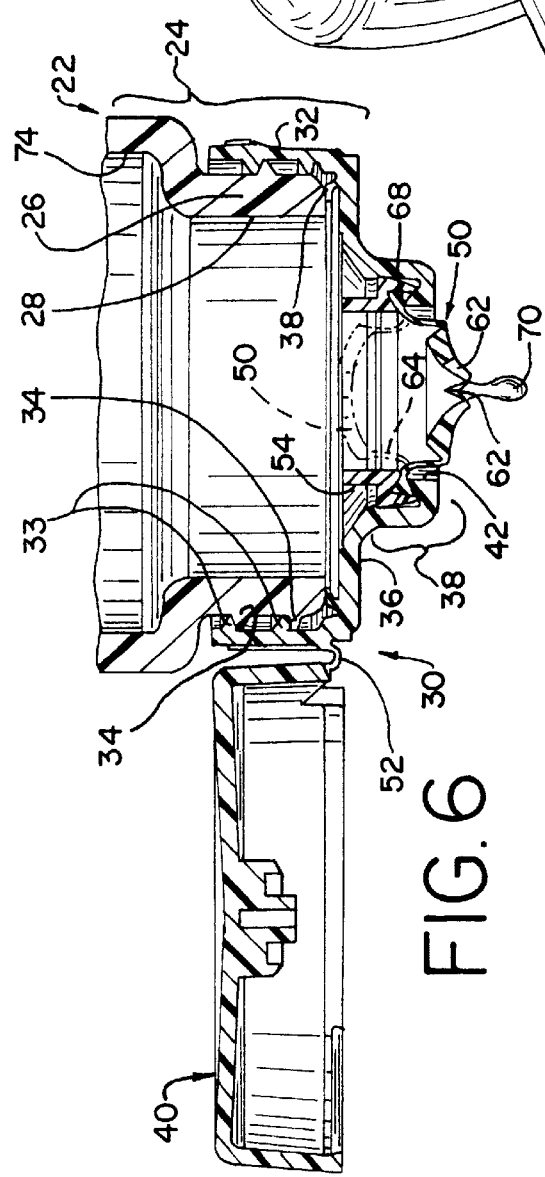

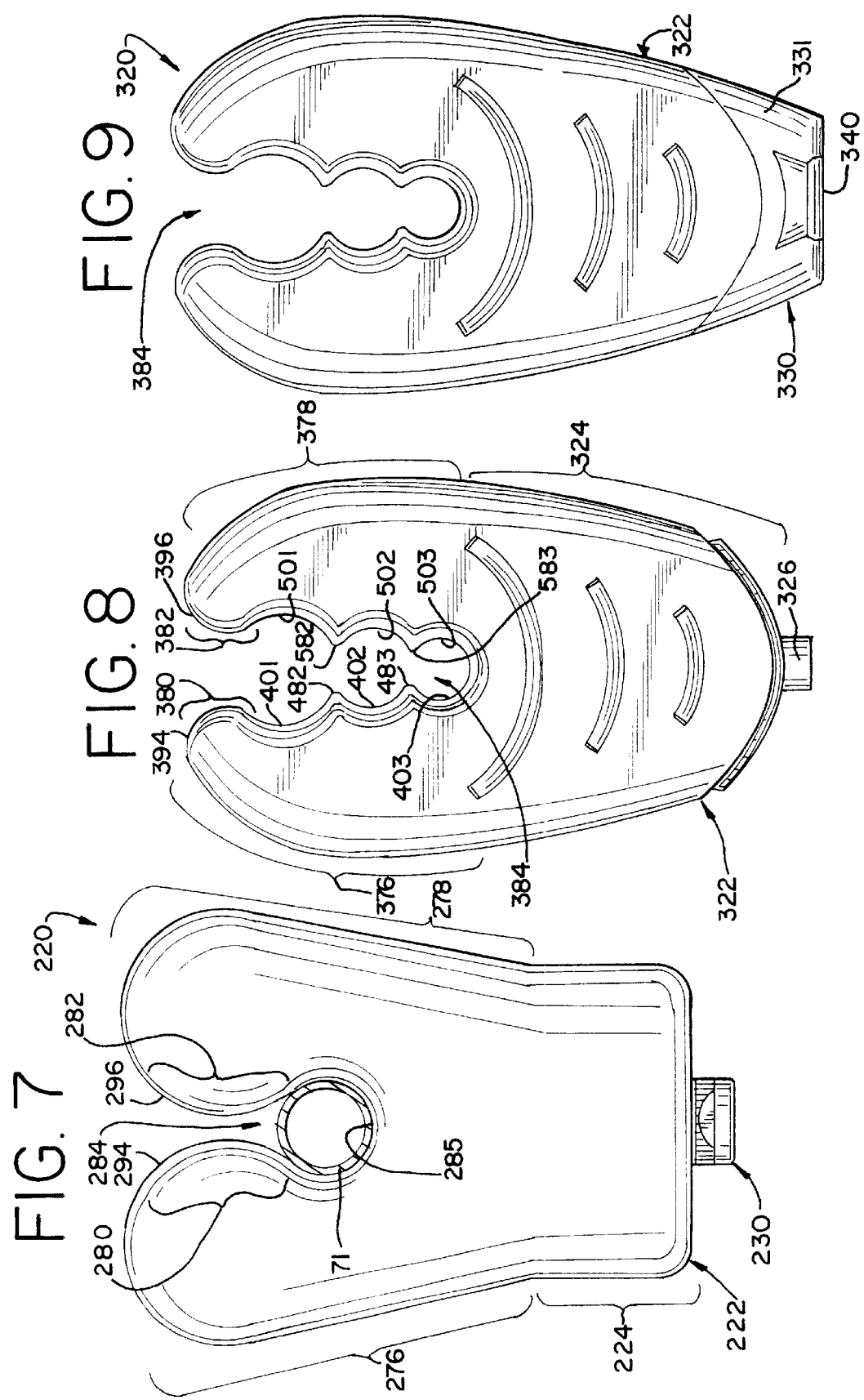

AIR AND SPACE VEHICLE PROPULSION SYSTEM

BACKGROUND OF THE INVENTION

This invention relates to modes of transportation, and is especially directed to manned and unmanned aerospace (i.e., air and/or space) vehicles. The invention is specifically directed to a drive system that can be employed in such vehicles.

A technique for suspending a communications platform (i.e., a communications mirror) at a low altitude (100 to 200 kilometers) is described in U.S. Pat. No. 4,253,190 to Csonka. There, the mirror is kept aloft above the atmosphere by pressure of electromagnetic radiation that is beamed up at it from a ground antenna. A similar technique for suspending a platform at a high altitude in the atmosphere is described in U.S. Pat. No. 4,704,732 to Csonka. In that arrangement, the platform is again kept aloft by radiation from a ground station. However, in this case, the energy received by the platform is transferred to air molecules that impinge on it, and these momentum transferred to these molecules (which move downwards) provide lifting force to the platform. The temperature density of the platform is controlled, so that the net direction of force is in the desired direction. The explanation for the principles that these two patents rely on, and the supporting engineering mathematics, are contained in these two patents, and their disclosure is incorporated herein by reference.

On the other hand, no one has proposed a system for manned or unmanned aerospace flight that relies on radiation pressure, nor has anyone suggested using an on-board electromagnetic source for propulsion, either by radiation pressure or by molecular momentum transfer. Currently, chemical-based rocket drives are employed for manned vehicles, unmanned space vehicles, and orbiting craft. There is a need for a clean and economical way to travel both in air and in space, which does not rely on chemically generated thrust.

Objects and Summary of the Invention

Accordingly, it is an object of the invention to provide an effective and efficient means for transportation, in space or in the atmosphere, which avoids the drawbacks of the prior art.

It is another object to provide a mode of transportation that can be modified for use underwater.

It is a further object to provide a transportation system that employs microwave circuits that can be located in the skin or hull of the aerospace craft, and which relies on radiant pressure and particle momentum transfer principles.

According to an aspect of this invention, an aerospace vehicle drive system is provided as a part of a vessel. The vessel hull is or may be formed of multiple layers, with a void or inter-layer space formed between an inner layer and an outer layer (or group of layers). Radiators of electromagnetic power, i.e. dipole antennas, are situated in the interlayer space. These may have reflectors formed in a part of the inner surface of this space, with the dipoles situated at the reflector. A power source, i.e. a source of electromagnetic wave energy, such as microwaves, inside the vessel is coupled to these radiators. A control mechanism, such as a control console, which may be computerized, controls the application of power to the radiators to control the direction of the net force and the amount of force that results from the drive. There may be a ring of radiators around the rim of the vessel as well.

In a preferred mode, the hull of the vessel is configured as a series of segments, and there are radiators in each of the segments. In this way the power may be controlled segment by segment. The outer layer may have a grooved inner surface, and the outer layer may be formed of either beryllium or titanium. Again, in a preferred embodiment, the vessel hull may have upper and lower hemispheres, with each hemisphere being divided into segments, i.e., thirty-six segments each having an extent of about ten degrees of arc. The outer hull may be of Teflon over a beryllium or titanium alloy. A transistion metal may be used at the grooved surface (i.e., $Cr_x$ $Mn_x$ antimonide, or another energy conducting material.

The propulsion system of this invention provides a clean, economical way for travel in the atmosphere or in space, and if modified can be used for marine use (surface or underwater). In each case, microwaves or other electromagnetic energy creates radiant pressure and results in particle momentum from the grooved layer of the hull.

There may be laser or maser weaponry provided in the vessel, which fire through windows provided on the rim between the upper and lower hemispheres.

The above and many other objects, features, and advantages of this invention will become apparent to persons skilled in the art from the ensuing description of a preferred embodiment, which should be considered in connection with the accompanying Drawing.

BRIEF DESCRIPTION OF THE DRAWING

FIG. 1 is a plan view of a vessel hull, illustrating segments, according to one embodiment of this invention.

FIG. 2 is a schematic view of a microwave source and control circuit.

FIG. 7 is a sectional view of a weapons optical window of this embodiment.

DETAILED DESCRIPTION OF A PREFERRED EMBODIMENTS

Figure 3:
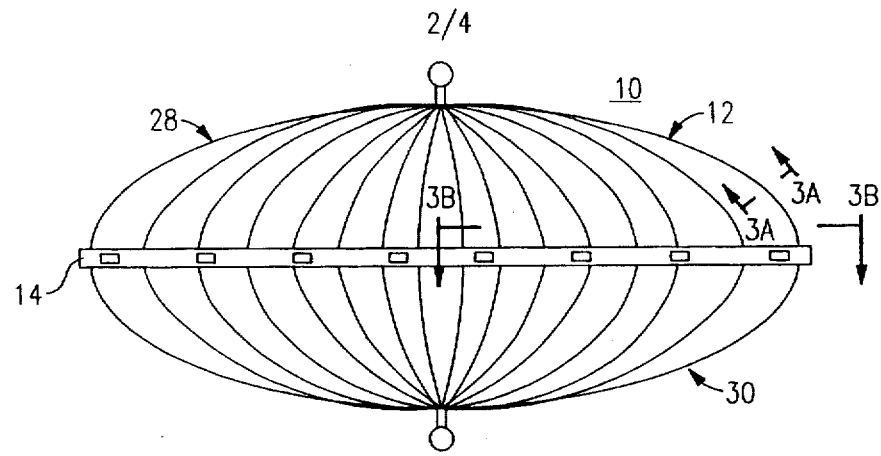
FIG. 3 is a side elevation of the vessel hull of this embodiment.

With reference to the Drawing, and initially to FIG. 1 thereof, a top plan view of the vessel or craft 10 shows the outer hull 12 and edges 14. The vessel is of a round, i.e., circular profile, and is configured into segments 16, here thirty-six segments each of ten degrees of arc.

FIG. 2 shows a power unit 20 of the type that is or may be used to power this vessel. Here, a power supply 22 supplies a maser circuit 24, which in turn provides microwave power to a maser device 26. A control input to the maser circuit 22 permits control from a control panel, to be discussed later. There are a number of these units 20 provided for each of the segments 16.

FIG. 3 is an elevational view of the hull 12, showing an upper hemisphere 28 and a lower hemisphere 30, each having thirty six segments, as mentioned earlier. Each of these segments has a number of radiators, i.e., dipoles, and the hull is multi-layered.

Figure 3A:
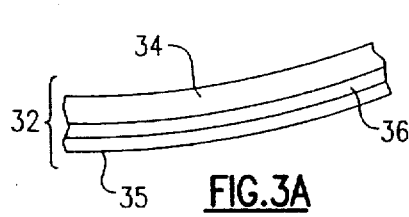
FIG. 3A shows a section of the hull or skin of the vessel.
Figure 3B:
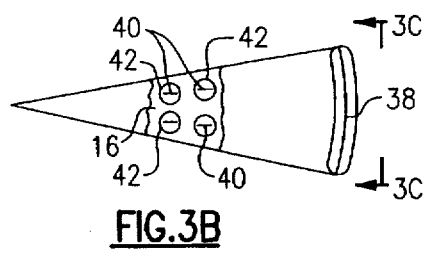
FIGS. 3B and 3C illustrate an edge of on of the segments of this embodiment.

FIG. 3A is a section of the hull skin or wall, and has a inner layer or group of layers 34 and an outer layer or group of layers 35, and these define between them an inter-layer gap or space 36. There are dipole radiators located in this space 36 for the purpose of microwave radiant emission to cause particle momentum, and resulting motive force. As shown in FIG. 3B, at an outer edge of each segment 16 there is a flange 38, and on this flange is situated one or more dipole antennas or radiators 40, which may be on a post above a spheric reflector 42.

Within the hull, there are a number of these dipoles 40 situated on similar reflectors 42 on the inner layer 34 facing the outer layer 35 across the gap or space 36. Inside the ship or vessel 10 there are respective microwave generators, i.e., power units 20, each contained in a respecive pod in this embodiment. Ceramic magnetic conduits 44 carry microwaves to the dipole radiators 40 which are situated in reflectors 42 in the hull skin (see FIG. 3B). For simplicity, only two of these are shown here. Also shown here, along the plane between the upper and lower hemispheres, there are or may be a plurality of traveling-wave wave guides 46 connecting an optical pump (discussed later) to optical windows 48 along the edge 14 of the hull.

Figure 5:
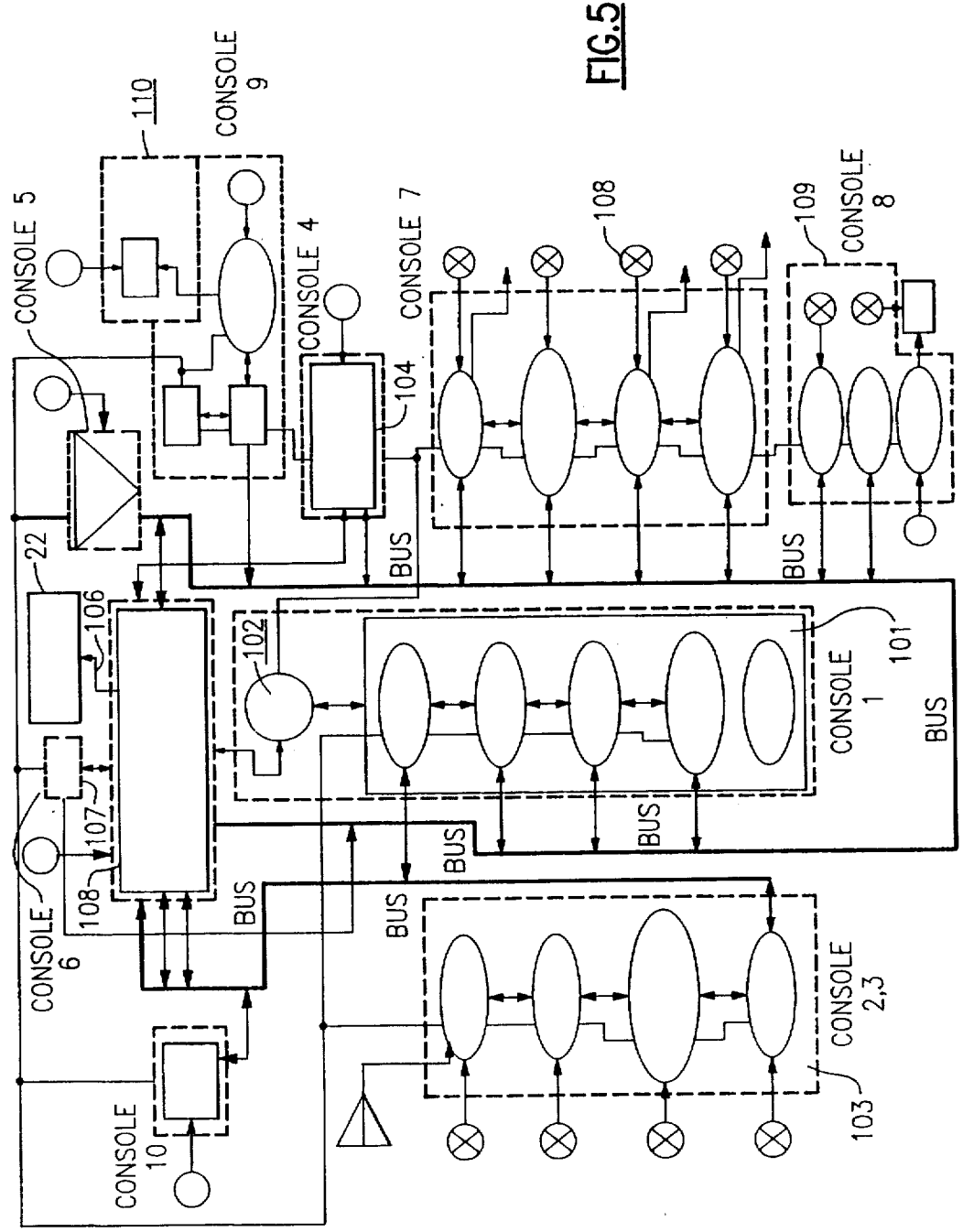
FIG. 5 is a schematic view of a control arrangement comprised of a number of consoles.
Figure 3:
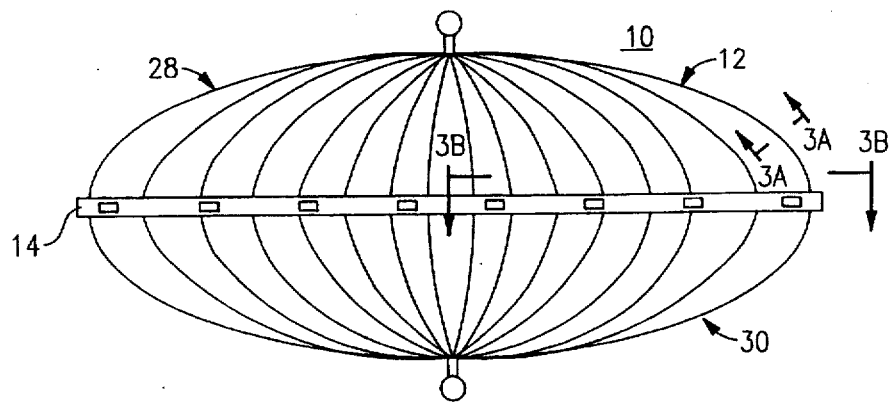
Figure 3A:
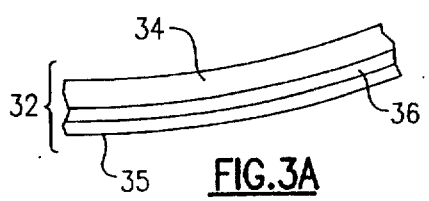
Figure 3B:
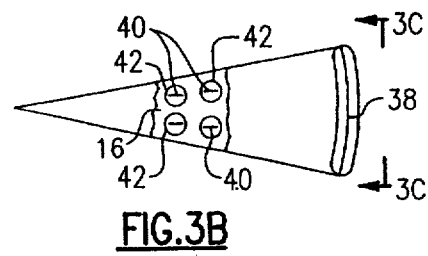
Figure 3C:
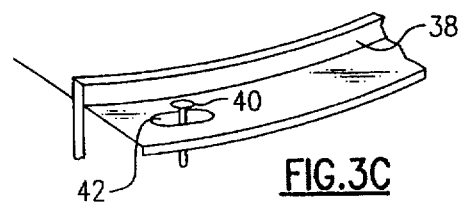
Figure 8:
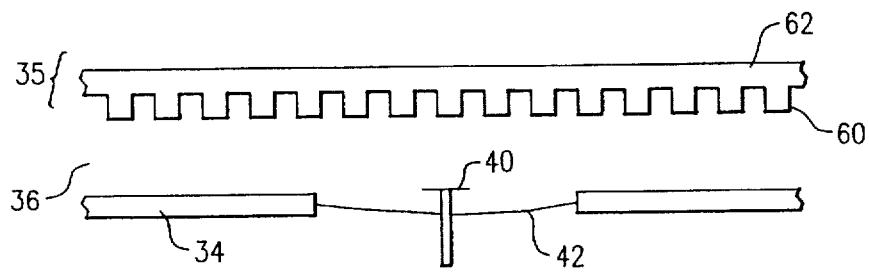
Figure 4:
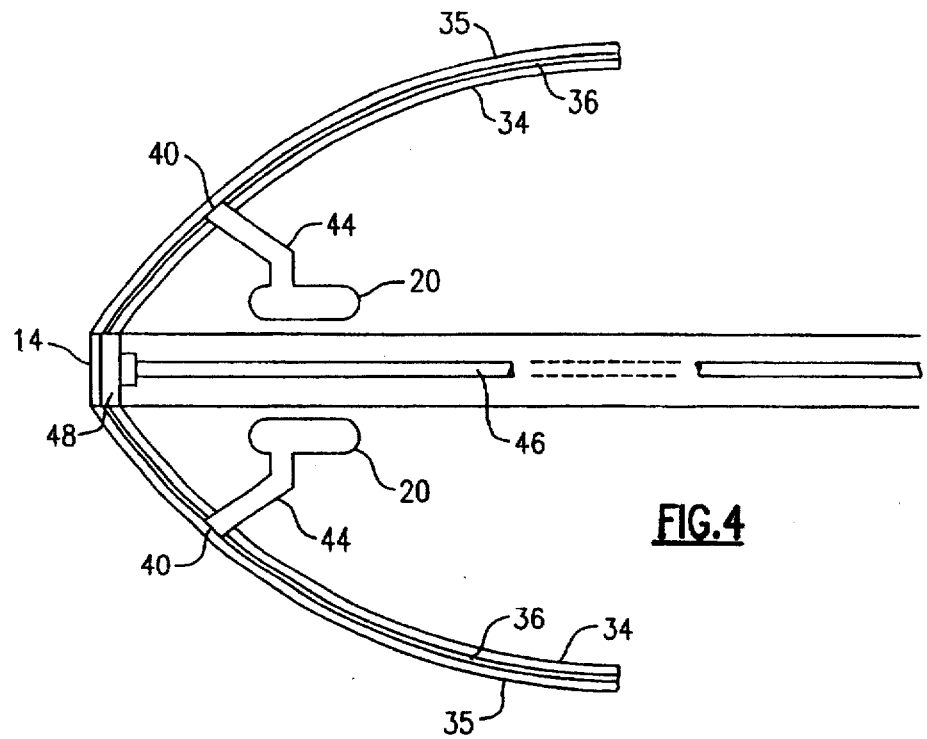
Figure 6:
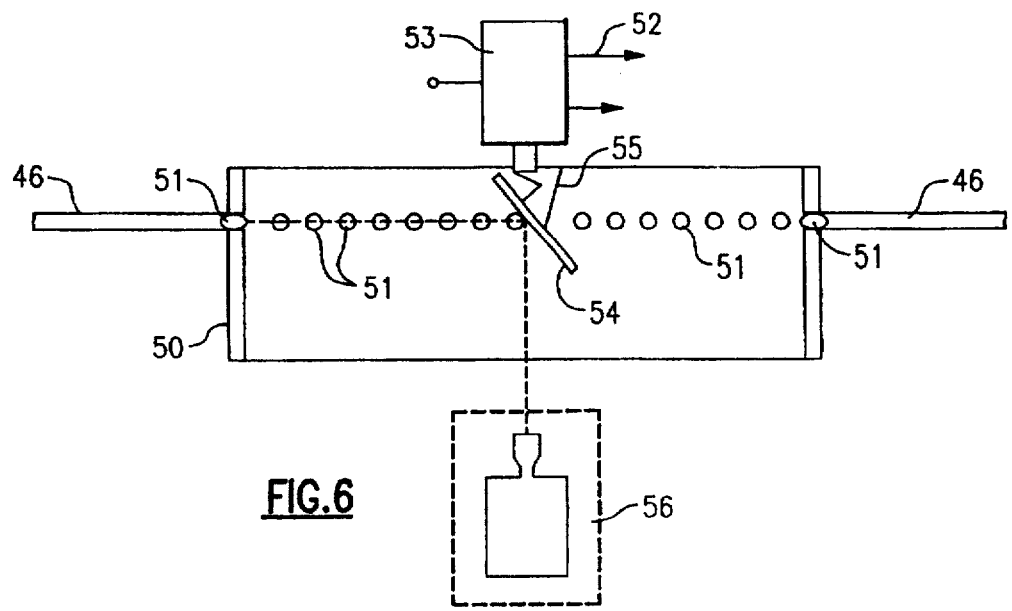
Figure 5:
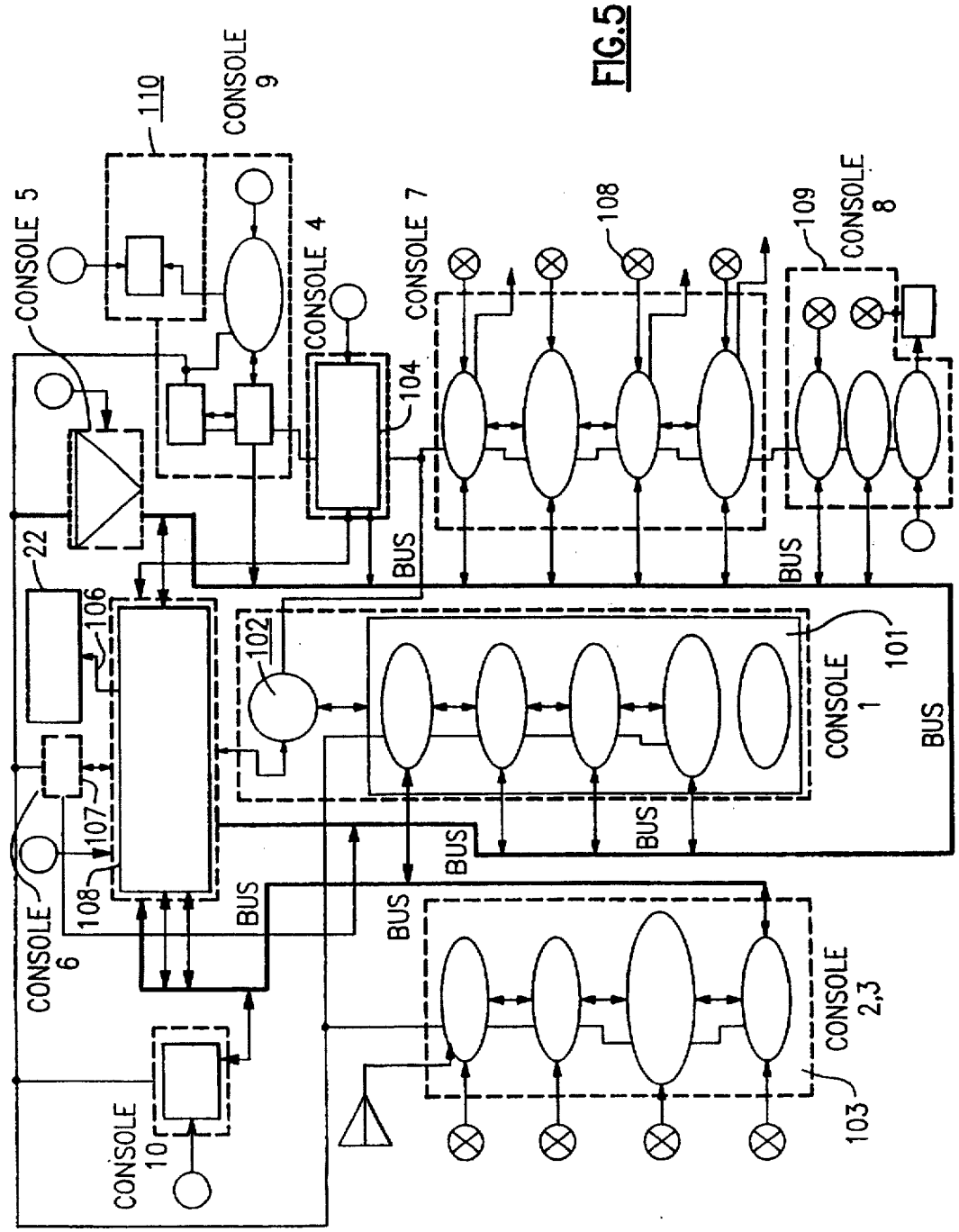

A control console arrangement is shown schematically in FIG. 5, comprised of a number of console boards, and joined to one another by signal and power buses. Here, a first console 101 contains modules for pilot communication, flight control, weapons triggering and targeting, systems monitoring and instrumentation, and life support monitoring. This console 101 has an associated joystick control 102 for pilot control of vehicle movement and of weaponry. Second and third comm interface consoles 103, here shown together, control communications and include modules for impedance matching, microwave transmission, compensation to correct error, and microwave transmission. A main communications console 104 is configured for connection with all exterior sites. A main computer console 105 coordinates all functions and monitors coordinates on board, conducts system checks and diagnostics, and connects to the joystick 102. This also controls stealth functions, using the microwave director antenna. Stealth may be active or passive. The main computer supplies control signals also along a signal bus 106 to the maser circuits 22 in each of the upper and lower segments. The main computer module 105 also connects to a life support systems console 107. At a weapons maser control console 108, there is a maser impedance matching module, an error correction module, a mixer control module, and a maser mirror control module, for stepmotor control, to be discussed shortly. Another module 109 has an RF control module, a systems check module, and RF generator module, and an RF output module. This provides RF signal to a marconi omnidirectional antenna on the bottom of the hull 12. A similar module 110 provides RF signal to a marconi omnidirectional antenna on the top of the hull.

Figure 6:
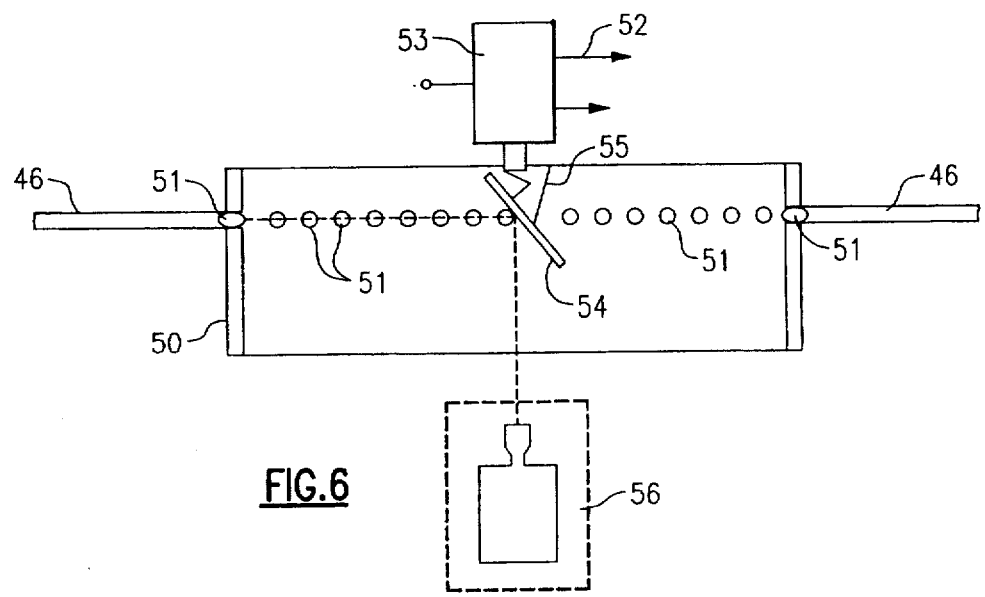
FIG. 6 an optical transducer for the vessel of this embodiment.

FIG. 6 illustrates the optical transducer that provides and directs optical energy to the traveling-wave wave guides 46 that carry it to the optical windows 48. A drum or cylindrical housing 50 holds respective optical connectors 51 for each of the guides 46. Each connector is at a predetermined angle in respect to the center of the housing 50. Stepmotor power lines 52 connect between a stepper motor 53 and the console 108, and the stepper motor controllably rotates an optical reflector or mirror 54 that is positioned on a mount 55 that is fitted onto the shaft of the motor 53. A maser 56 or other source of energized particles or photons is or may be positioned on the axis of the stepper motor 53, and the mirror steers the optical axis of the maser 56 to align with one or another of the travelling wave waveguides 46.

The outer or distal end of the waveguides 46 is shown in detail in FIG. 7, where an end termination 58, i.e., an optical pump and focussing device, emits energy through the optical window 48 at the rim 14 of the vessel. The upper and lower hemispheres 28, 30 of the hull 12 are shown here also.

Figure 8:
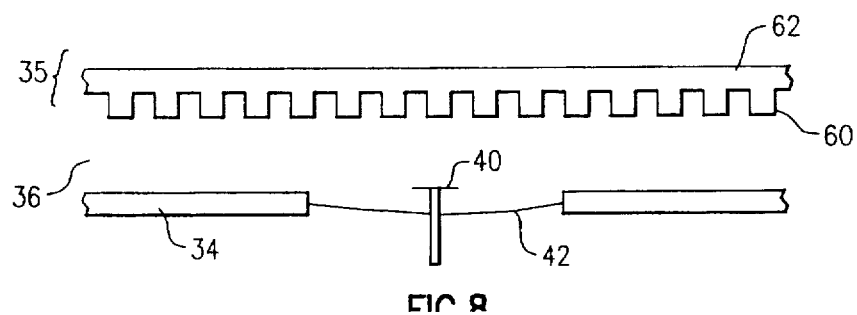
FIG. 8 is a sectional view of a portion of the hull of this embodiment.

Details of the structure of the hull 12 are shown in FIG. 8. Here, one of the radiators 40 is shown in a portion of the hull inner layer 34, situated in an associated concave reflector 42 formed in the layer 34. The outer layer 35 is situated across the inter-layer space 36 from the layer 34. Here, the facing (lower) side of the outer layer 35 is formed of a conductive material having grooves or teeth 60. These may be formed of beryllium or titanium, and exterior of these grooves or teeth, the remaining layer portion 62 may be the same or a different material, such as Teflon. Electromagnetic energy, i.e., microwaves, become trapped in the grooves 60 or between the teeth and the trapped energy creates heat, that in turn creates particle momentum for propulsion purposes, as discussed above and in connection with U.S. Pat. No. 4,704,732. The inner hull layer 34 may have removeable panels to provide access for maintenance, except that the distance from radio emitter to the surface 60 is reduced to a few inches.

The hull 12 of the vessel or craft 10 may be a titanium alloy of the type commonly used by government space agencies and contractors, or may be a pure beryllium. The inner hull layer may be a titanium alloy. In the weapons system, the optical windows 48 may be a crystal composite, with outer layer of sapphire and inner center of ruby. The wave guide 46 may be a tunable wave guide.

The control consoles, as discussed above with reference to FIG. 5, constitute the interface for the pilot. These may provide the pilot with all needed data and controls through buslines to the computer. Panel controls are mounted into the consoles so as to be accessable to the pilot. The omnidirectional marconis are for communications and sensors (telemetry). A main gyroscope connects with the pilot's gyroscope and gives positional data used in navigation and (optionally) for radio astronomy. The consoles also monitor life support functions, and may connect with instrumentation for checking atmosphere, humidity, and temperature. The consoles also employ a joystick control for the pilot to control direction and amount of levitation and thrust, and for control of weaponry. The weapons can be pre-tested at a low energy level, i.e., by using the maser 56 at a low energy level, for flight check and simulations, and in connection with director stealth functions.

In a preferred mode, the dipoles 40 may have an impedance of 300 ohms. A transistion metal alloy, such as chromium-manganese-antimony may be used in the vehicle hull 12, with the amount of antimony being selected to change the transistion point at which is starts to create a magnetic flux. Common ceramic permanent magnet materials may be used for microwave applications in connection with this invention, such as barium ferrite (oriented), strontium ferrite, yttrium iron garnet, yttrium aluminum, gadolinium garnet, dysprosium (in ferrite). Beryllium aluminum (i.e., 33% aluminum) may be used as a beryllium alloy, as it has a good tensile strength and a high conductivity and high heat capacity, as well as being non-magnetic. Beryllium oxide, which may provide surface insulation, is a good conductor of heat.

The vessel according to this invention provides a clean, economical means for transportation in air or in space, and may be adapted for travel in or under water. The pilot or operator, one inside the vessel, can power up the systems, initiate pre-flight checks, and then use the joystick to engage and initiate flight.

While the invention has been described in reference to a preferred embodiment, it should be understood that the invention is not limited to that precise embodiment. Rather, many modifications and variations will present themselves to those skilled in the art without departing from the scope and spirit of the invention, as defined in the appended claims.

I claim:

1. An aerospace vehicle drive, comprising a hull, said hull having a plurality of layers defining an inter-layer space between two of said layers; a plurality of electromagnetic emitters situated in said inter-layer space; power means within said hull providing electromagnetic energy; and control means for controlling application of said electromagnetic energy to the respective emitters and thus control the net amount and direction of force provided by said drive.

2. The aerospace vehicle drive according to claim 1, wherein said emitters comprise dipole emitters.

3. The aerospace vehicle drive according to claim 1, wherein said hull is configured as a plurality of segments, with each segment having one or more of said emitters.

4. An aerospace vehicle drive comprising a hull, said hull having a plurality of layers defining an inter-layer space between two of said layers; a plurality of electromagnetic emitters situated in said inter-layer space; power means within said hull providing electromagnetic energy; and control means for controlling application of said electromagnetic energy to the respective emitters and thus control the net amount and direction of force provided by said drive, wherein an outer one of said layers has a grooved inner surface.

5. The aerospace vehicle drive according to claim 4, wherein said outer layer is formed of beryllium or titanium.

6. An aerospace vehicle and drive mechanism therefore, comprising a hull having upper and lower hemispheres, each hemisphere being divided into a plurality of segments; a plurality of electromagnetic emitters distributed over the hull such that each of said segments has one or more of said emitters; a source of electromagnetic energy within the hull, and supplying electromagnetic energy to said emitters; and control means for controlling application of said electromagnetic energy to the respective emitters and thus control to the net amount and direction of force provided by said drive.

7. The aerospace vehicle and drive mechanism therefor, according to claim 6, wherein said hull is in the form of a plurality of layers defining an inter-layer space between two of said layers, and wherein at least some of said emitters are situated in said inter-layer space.

8. An aerospace vehicle and drive mechanism therefore, comprising a hull having upper and lower hemispheres, each hemisphere being divided into a plurality of segments; a plurality of electromagnetic emitters distributed over the hull such that each of said segments has one or more of said emitters: a source of electromagnetic energy within the hull, and supplying electromagnetic energy to said emitters; and control means for controlling application of said electromagnetic energy to the respective emitters and thus control the net amount and direction of force provided by said drive; wherein said hull is in the form of a plurality of layers defining an inter-layer space between two of said layers, and wherein at least some of said emitters are situated in said inter-layer space; and wherein an outer layer of said hull has a grooved inner surface. each of said segments has one or more of said emitters; a source of electromagnetic energy within the hull, and supplying electromagnetic energy to said emitters; and control means for controlling application of said electromagnetic energy to the respective emitters and thus control the net amount and direction of force provided by said drive.

\* \* \* \* \*

UNITED STATES PATENT AND TRADEMARK OFFICE
CERTIFICATE OF CORRECTION

PATENT NO.    : 6,179,250 B1
DATED         : January 30, 2001
INVENTOR(S)   : Laurence Waters It is certified that error appears in the above-identified patent and that said Letters Patent is hereby corrected as shown below:

Title page,
The title page, showing the illustrative figure should be deleted and sustitute therefore the attached title page.

Drawings,
Replace the three (3) sheets of drawing figures with the attached four (4) sheets containing Figs. 1 to 8.

Column 6,
Lines 31-37, after "inner surface.", all text should be deleted.

Signed and Sealed this

Twenty-seventh Day of November, 2001

Attest:

*Nicholas P. Godici*

NICHOLAS P. GODICI
*Attesting Officer*   *Acting Director of the United States Patent and Trademark Office*

United States Patent
Waters

(10) Patent No.: US 6,179,250 B1
(45) Date of Patent: Jan. 30, 2001

(54) AIR AND SPACE VEHICLE PROPULSION SYSTEM

(76) Inventor: Laurence Waters, 541 Stone St., Watertown, NY (US) 13601

(*) Notice: Under 35 U.S.C. 154(b), the term of this patent shall be extended for 0 days.

(21) Appl. No.: 09/247,961

(22) Filed: Feb. 10, 1999

(51) Int. Cl.$^7$ ............................................. B64C 27/00
(52) U.S. Cl. ................................... 244/62; 244/172
(58) Field of Search ............................ 244/62, 53 R, 244/172, 158 R

(56) References Cited

U.S. PATENT DOCUMENTS

| | | | |
|---|---|---|---|
| 3,095,163 | * 6/1963 | Hill | 244/62 |
| 3,150,363 | 9/1964 | Finvold | 343/59 A |
| 3,151,325 | 9/1964 | Kompfner | 343/100 AM |
| 3,169,245 | 2/1965 | Cutler | 343/100 ST |
| 3,373,430 | 3/1968 | Croswell et al. | 343/773 |
| 3,495,791 | * 2/1970 | Drell et al. | 244/172 |
| 3,504,868 | * 4/1970 | Engelberger | 244/172 |
| 3,656,166 | 4/1972 | Klopach et al. | 343/773 |
| 3,662,554 | * 5/1972 | De Broqueville | 244/62 |
| 4,253,190 | 2/1981 | Czonka | 244/62 |
| 4,663,932 | * 5/1987 | Cox | 60/200.1 |
| 4,704,732 | 11/1987 | Czonka | 244/62 |
| 5,142,861 | * 9/1992 | Schlicher et al. | 60/203.1 |
| 5,818,649 | * 10/1998 | Anderson | 359/726 |

* cited by examiner

*Primary Examiner*—J. Woodrow Eldred
(74) *Attorney, Agent, or Firm*—Bernhard P. Molldrem, Jr.

(57) ABSTRACT

A propulsion system for aerospace vehicles employs dipole radiators in an interlayer space between outer and inner layers of the vehicle hull. Microwaves are applied, via a control console, to the radiators. The hull may be configured as sectors, and energy may be applied sector by sector to control levitation and propulsion. The outer hull layer can have a grooved inner surface, and may be formed of a titanium or beryllium alloy.

8 Claims, 4 Drawing Sheets

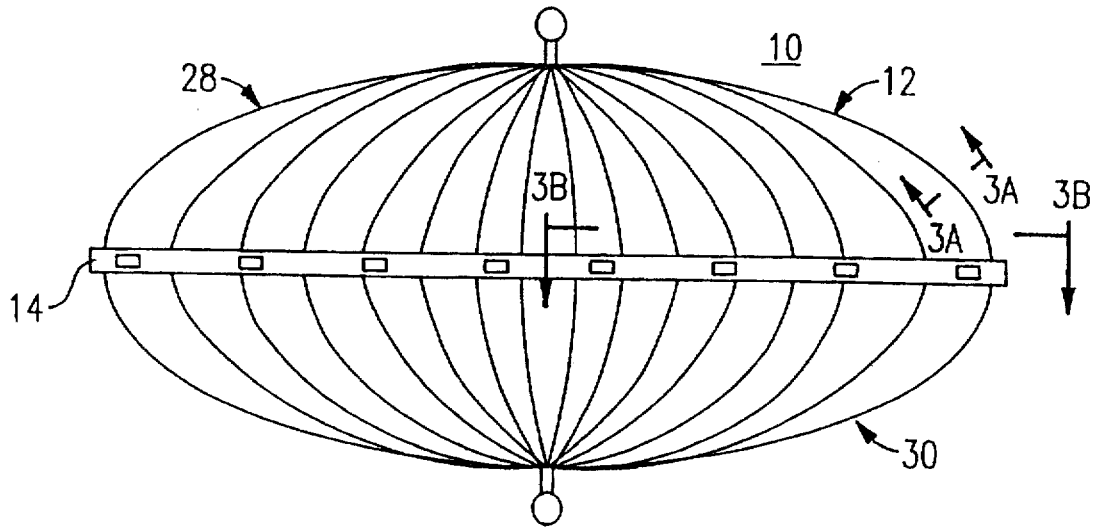

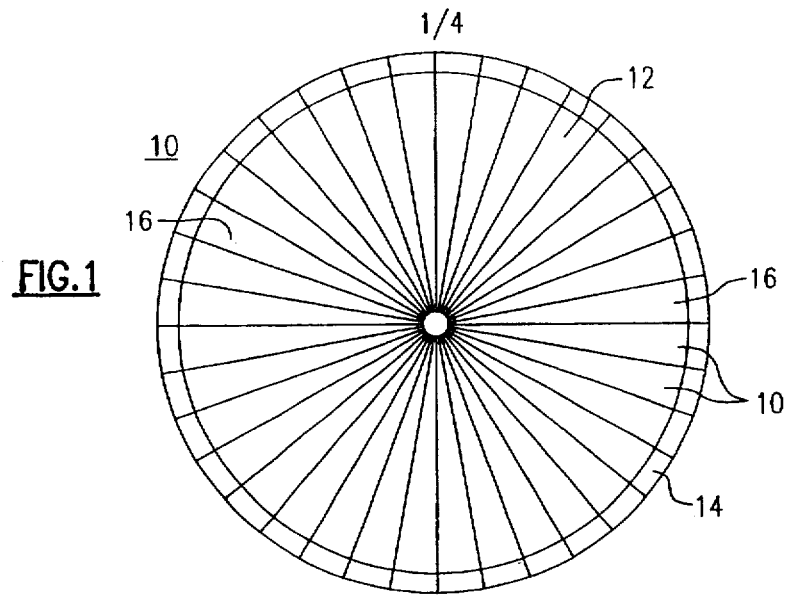
FIG. 1
FIG. 2
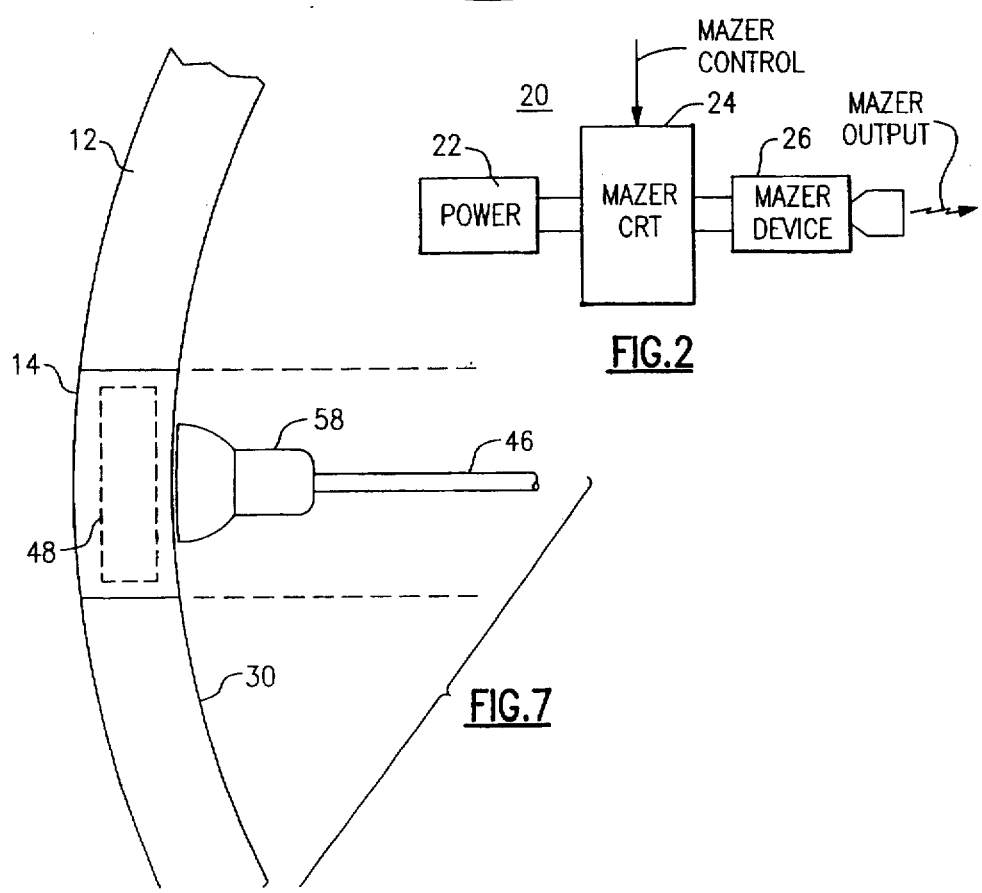
FIG. 7

UNITED STATES PATENT AND TRADEMARK OFFICE
CERTIFICATE OF CORRECTION

PATENT NO. : 6,179,250 B1  Page 1 of 9
DATED : January 30, 2001
INVENTOR(S) : Laurence Waters It is certified that error appears in the above-identified patent and that said Letters Patent is hereby corrected as shown below:

See Drawings.
See Claim 8.

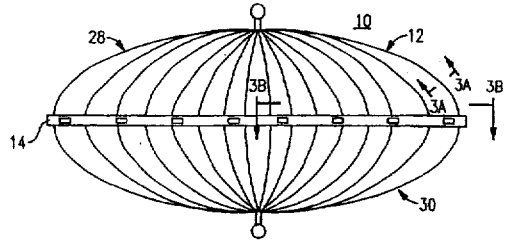

Signed and Sealed this

Fifth Day of February, 2002

Attest:

JAMES E. ROGAN
*Attesting Officer*    *Director of the United States Patent and Trademark Office*

(12) United States Patent
Waters

(10) Patent No.: US 6,179,250 B1
(45) Date of Patent: Jan. 30, 2001

(54) AIR AND SPACE VEHICLE PROPULSION SYSTEM

(76) Inventor: Laurence Waters, 541 Stone St., Watertown, NY (US) 13601

(*) Notice: Under 35 U.S.C. 154(b), the term of this patent shall be extended for 0 days.

(21) Appl. No.: 09/247,961

(22) Filed: Feb. 10, 1999

(51) Int. Cl.$^7$ ............................................. B64C 27/00
(52) U.S. Cl. ...................................... 244/62; 244/172
(58) Field of Search ............................. 244/62, 53 R, 244/172, 158 R

(56) References Cited

U.S. PATENT DOCUMENTS

| | | | |
|---|---|---|---|
| 3,095,163 * | 6/1963 | Hill | 244/62 |
| 3,150,363 | 9/1964 | Finvold | 343/59 A |
| 3,151,325 | 9/1964 | Kompfner | 343/100 AM |
| 3,169,245 | 2/1965 | Cutler | 343/100 ST |
| 3,373,430 | 3/1968 | Croswell et al. | 343/773 |
| 3,495,791 * | 2/1970 | Drell et al. | 244/172 |
| 3,504,868 * | 4/1970 | Engelberger | 244/172 |
| 3,656,166 | 4/1972 | Klopach et al. | 343/773 |
| 3,662,554 * | 5/1972 | De Broqueville | 244/62 |
| 4,253,190 | 2/1981 | Czonka | 244/62 |
| 4,663,932 * | 5/1987 | Cox | 60/200.1 |
| 4,704,732 | 11/1987 | Czonka | 244/62 |
| 5,142,861 * | 9/1992 | Schlicher et al. | 60/203.1 |
| 5,818,649 * | 10/1998 | Anderson | 359/726 |

* cited by examiner

Primary Examiner—J. Woodrow Eldred
(74) Attorney, Agent, or Firm—Bernhard P. Molldrem, Jr.

(57) ABSTRACT

A propulsion system for aerospace vehicles employs dipole radiators in an interlayer space between outer and inner layers of the vehicle hull. Microwaves are applied, via a control console, to the radiators. The hull may be configured as sectors, and energy may be applied sector by sector to control levitation and propulsion. The outer hull layer can have a grooved inner surface, and may be formed of a titanium or beryllium alloy.

8 Claims, 4 Drawing Sheets

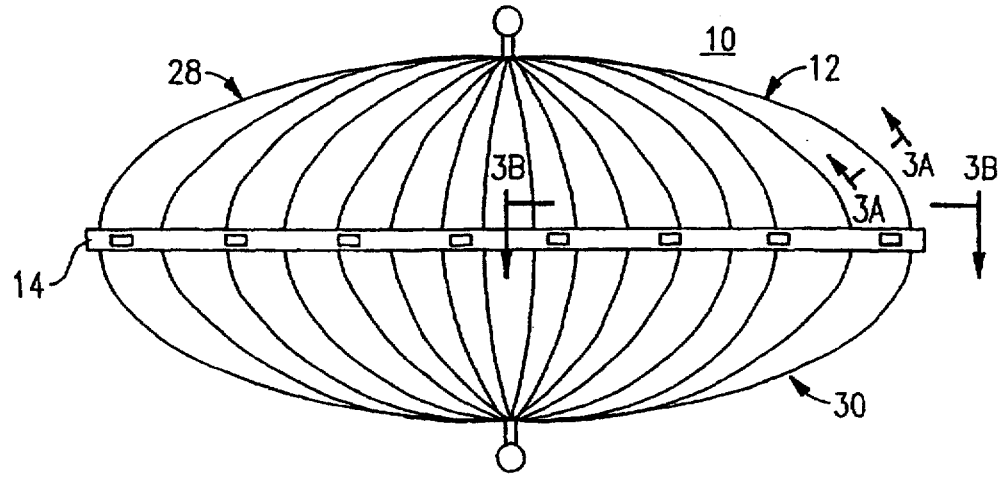

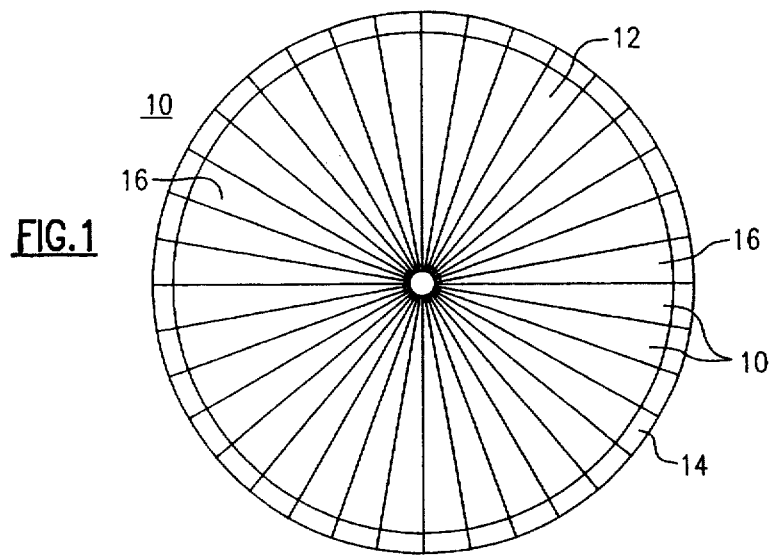
FIG.1
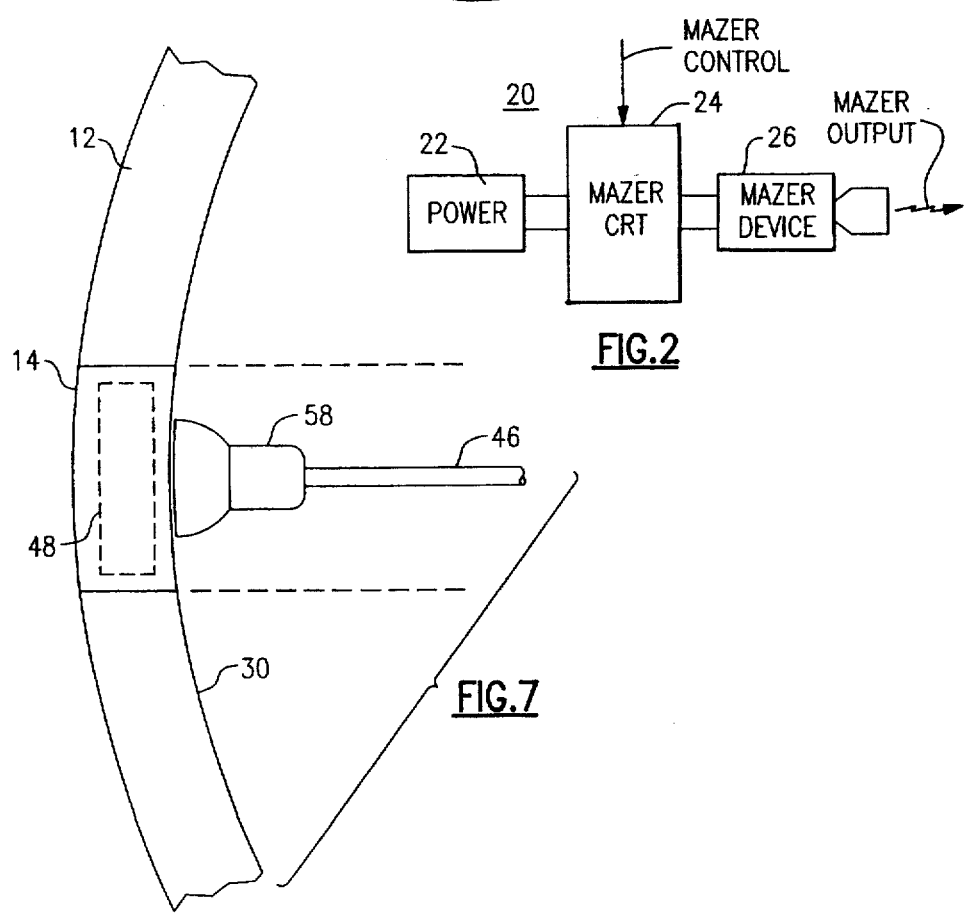
FIG.2
FIG.7

AIR AND SPACE VEHICLE PROPULSION SYSTEM

BACKGROUND OF THE INVENTION

This invention relates to modes of transportation, and is especially directed to manned and unmanned aerospace (i.e., air and/or space) vehicles. The invention is specifically directed to a drive system that can be employed in such vehicles.

A technique for suspending a communications platform (i.e., a communications mirror) at a low altitude (100 to 200 kilometers) is described in U.S. Pat. No. 4,253,190 to Csonka. There, the mirror is kept aloft above the atmosphere by pressure of electromagnetic radiation that is beamed up at it from a ground antenna. A similar technique for suspending a platform at a high altitude in the atmosphere is described in U.S. Pat. No. 4,704,732 to Csonka. In that arrangement, the platform is again kept aloft by radiation from a ground station. However, in this case, the energy received by the platform is transferred to air molecules that impinge on it, and these momentum transferred to these molecules (which move downwards) provide lifting force to the platform. The temperature density of the platform is controlled, so that the net direction of force is in the desired direction. The explanation for the principles that these two patents rely on, and the supporting engineering mathematics, are contained in these two patents, and their disclosure is incorporated herein by reference.

On the other hand, no one has proposed a system for manned or unmanned aerospace flight that relies on radiation pressure, nor has anyone suggested using an on-board electromagnetic source for propulsion, either by radiation pressure or by molecular momentum transfer. Currently, chemical-based rocket drives are employed for manned vehicles, unmanned space vehicles, and orbiting craft. There is a need for a clean and economical way to travel both in air and in space, which does not rely on chemically generated thrust.

Objects and Summary of the Invention

Accordingly, it is an object of the invention to provide an effective and efficient means for transportation, in space or in the atmosphere, which avoids the drawbacks of the prior art.

It is another object to provide a mode of transportation that can be modified for use underwater.

It is a further object to provide a transportation system that employs microwave circuits that can be located in the skin or hull of the aerospace craft, and which relies on radiant pressure and particle momentum transfer principles.

According to an aspect of this invention, an aerospace vehicle drive system is provided as a part of a vessel. The vessel hull is or may be formed of multiple layers, with a void or inter-layer space formed between an inner layer and an outer layer (or group of layers). Radiators of electromagnetic power, i.e. dipole antennas, are situated in the inter-layer space. These may have reflectors formed in a part of the inner surface of this space, with the dipoles situated at the reflector. A power source, i.e., a source of electromagnetic wave energy, such as microwaves, inside the vessel is coupled to these radiators. A control mechanism, such as a control console, which may be computerized, controls the application of power to the radiators to control the direction of the net force and the amount of force that results from the drive. There may be a ring of radiators around the rim of the vessel as well.

In a preferred mode, the hull of the vessel is configured as a series of segments, and there are radiators in each of the segments. In this way the power may be controlled segment by segment. The outer layer may have a grooved inner surface, and the outer layer may be formed of either beryllium or titanium. Again, in a preferred embodiment, the vessel hull may have upper and lower hemispheres, with each hemisphere being divided into segments, i.e., thirty-six segments each having an extent of about ten degrees of arc. The outer hull may be of Teflon over a beryllium or titanium alloy. A transistion metal may be used at the grooved surface (i.e., $Cr_x$, $Mn_x$ antimonide, or another energy conducting material.

The propulsion system of this invention provides a clean, economical way for travel in the atmosphere or in space, and if modified can be used for marine use (surface or underwater). In each case, microwaves or other electromagnetic energy creates radiant pressure and results in particle momentum from the grooved layer of the hull.

There may be laser or maser weaponry provided in the vessel, which fire through windows provided on the rim between the upper and lower hemispheres.

The above and many other objects, features, and advantages of this invention will become apparent to persons skilled in the art from the ensuing description of a preferred embodiment, which should be considered in connection with the accompanying Drawing.

BRIEF DESCRIPTION OF THE DRAWING

FIG. 1 is a plan view of a vessel hull, illustrating segments, according to one embodiment of this invention.

FIG. 2 is a schematic view of a microwave source and control circuit.

FIG. 3 is a side elevation of the vessel hull of this embodiment.

FIG. 3A shows a section of the hull or skin of the vessel.

Figure 3C:
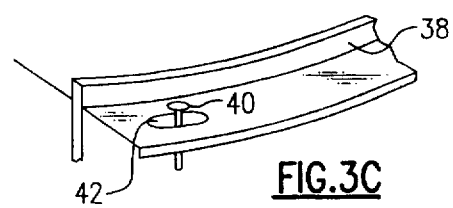

FIGS. 3B and 3C illustrate an edge of on of the segments of this embodiment.

Figure 4:
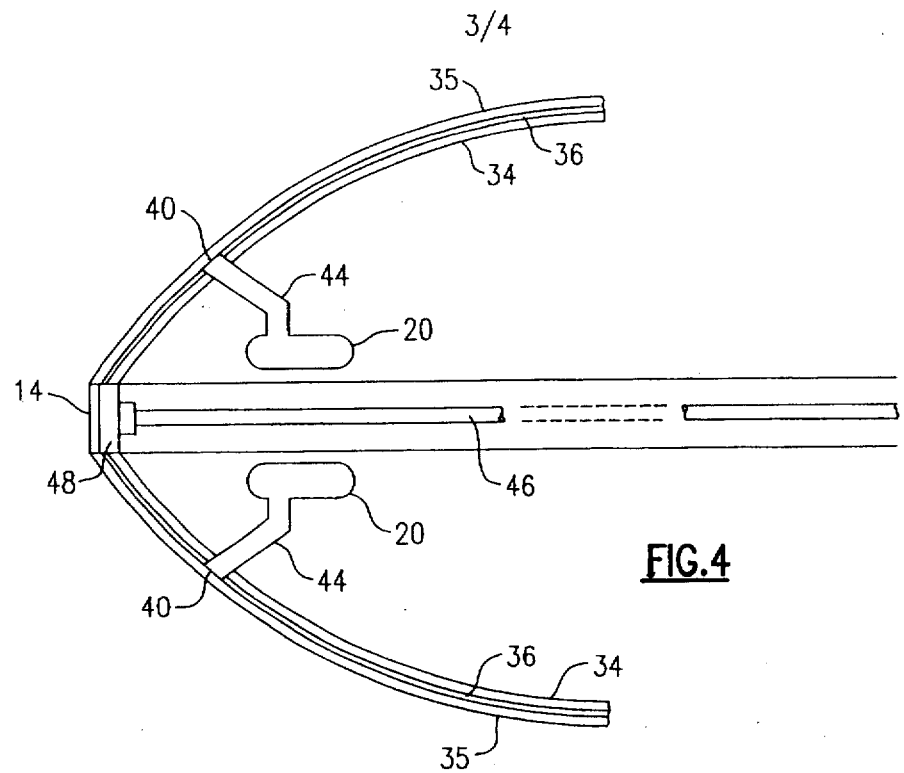
FIG. 4 is a sectional elevation showing the application of power to radiators in the vessel hull.

FIG. 4 is a sectional elevation showing the application of power to radiators in the vessel hull.

FIG. 5 is a schematic view of a control arrangement comprised of a number of consoles.

FIG. 6 an optical transducer for the vessel of this embodiment.

FIG. 7 is a sectional view of a weapons optical window of this embodiment.

FIG. 8 is a sectional view of a portion of the hull of this embodiment.

DETAILED DESCRIPTION OF A PREFERRED EMBODIMENT

With reference to the Drawing, and initially to FIG. 1 thereof, a top plan view of the vessel or craft 10 shows the outer hull 12 and edges 14. The vessel is of a round, i.e., circular profile, and is configured into segments 16, here thirty-six segments each of ten degrees of arc.

FIG. 2 shows a power unit 20 of the type that is or may be used to power this vessel. Here, a power supply 22 supplies a maser circuit 24, which in turn provides microwave power to a maser device 26. A control input to the maser circuit 22 permits control from a control panel, to be discussed later. There are a number of these units 20 provided for each of the segments 16.

FIG. 3 is an elevational view of the hull 12, showing an upper hemisphere 28 and a lower hemisphere 30, each having thirty six segments, as mentioned earlier. Each of these segments has a number of radiators, i.e., dipoles, and the hull is multi-layered.

FIG. 3A is a section of the hull skin or wall, and has a inner layer or group of layers 34 and an outer layer or group of layers 35, and these define between them an inter-layer gap or space 36. There are dipole radiators located in this space 36 for the purpose of microwave radiant emission to cause particle momentum, and resulting motive force. As shown in FIG. 3B, at an outer edge of each segment 16 there is a flange 38, and on this flange is situated one or more dipole antennas or radiators 40, which may be on a post above a spheric reflector 42.

Within the hull, there are a number of these dipoles 40 situated on similar reflectors 42 on the inner layer 34 facing the outer layer 35 across the gap or space 36. Inside the ship or vessel 10 there are respective microwave generators, i.e., power units 20, each contained in a respecive pod in this embodiment. Ceramic magnetic conduits 44 carry microwaves to the dipole radiators 40 which are situated in reflectors 42 in the hull skin (see FIG. 3B). For simplicity, only two of these are shown here. Also shown here, along the plane between the upper and lower hemispheres, there are or may be a plurality of traveling-wave wave guides 46 connecting an optical pump (discussed later) to optical windows 48 along the edge 14 of the hull.

A control console arrangement is shown schematically in FIG. 5, comprised of a number of console boards, and joined to one another by signal and power buses. Here, a first console 101 contains modules for pilot communication, flight control, weapons triggering and targeting, systems monitoring and instrumentation, and life support monitoring. This console 101 has an associated joystick control 102 for pilot control of vehicle movement and of weaponry. Second and third comm interface consoles 103, here shown together, control communications and include modules for impedance matching, microwave transmission, compensation to correct error, and microwave transmission. A main communications console 104 is configured for connection with all exterior sites. A main computer console 105 coordinates all functions and monitors coordinates on board, conducts system checks and diagnostics, and connects to the joystick 102. This also controls stealth functions, using the microwave director antenna. Stealth may be active or passive. The main computer supplies control signals also along a signal bus 106 to the maser circuits 22 in each of the upper and lower segments. The main computer module 105 also connects to a life support systems console 107. At a weapons maser control console 108, there is a maser impedance matching module, an error correction module, a mixer control module, and a maser mirror control module, for stepmotor control, to be discussed shortly. Another module 109 has an RF control module, a systems check module, and RF generator module, and an RF' output module. This provides RF signal to a marconi omnidirectional antenna on the bottom of the hull 12. A similar module 110 provides RF signal to a marconi omnidirectional antenna on the top of the hull.

FIG. 6 illustrates the optical transducer that provides and directs optical energy to the traveling-wave wave guides 46 that carry it to the optical windows 48. A drum or cylindrical housing 50 holds respective optical connectors 51 for each of the guides 46. Each connector is at a predetermined angle in respect to the center of the housing 50. Stepmotor power lines 52 connect between a stepper motor 53 and the console 108, and the stepper motor controllably rotates an optical reflector or mirror 54 that is positioned on a mount 55 that is fitted onto the shaft of the motor 53. A maser 56 or other source of energized particles or photons is or may be positioned on the axis of the stepper motor 53, and the mirror steers the optical axis of the maser 56 to align with one or another of the travelling wave waveguides 46.

The outer or distal end of the waveguides 46 is shown in detail in FIG. 7, where an end termination 58, i.e., an optical pump and focussing device, emits energy through the optical window 48 at the rim 14 of the vessel. The upper and lower hemispheres 28, 30 of the hull 12 are shown here also.

Details of the structure of the hull 12 are shown in FIG. 8. Here, one of the radiators 40 is shown in a portion of the hull inner layer 34, situated in an associated concave reflector 42 formed in the layer 34. The outer layer 35 is situated across the inter-layer space 36 from the layer 34. Here, the facing (lower) side of the outer layer 35 is formed of a conductive material having grooves or teeth 60. These may be formed of beryllium or titanium, and exterior of these grooves or teeth, the remaining layer portion 62 may be the same or a different material, such as Teflon. Electromagnetic energy, i.e., microwaves, become trapped in the grooves 60 or between the teeth and the trapped energy creates heat, that in turn creates particle momentum for propulsion purposes, as discussed above and in connection with U.S. Pat. No. 4,704,732. The inner hull layer 34 may have removeable panels to provide access for maintenance, except that the distance from radio emitter to the surface 60 is reduced to a few inches.

The hull 12 of the vessel or craft 10 may be a titanium alloy of the type commonly used by government space agencies and contractors, or may be a pure beryllium. The inner hull layer may be a titanium alloy. In the weapons system, the optical windows 48 may be a crystal composite, with outer layer of sapphire and inner center of ruby. The wave guide 46 may be a tunable wave guide.

The control consoles, as discussed above with reference to FIG. 5, constitute the interface for the pilot. These may provide the pilot with all needed data and controls through buslines to the computer. Panel controls are mounted into the consoles so as to be accessable to the pilot. The omnidirectional marconis are for communications and sensors (telemetry). A main gyroscope connects with the pilot's gyroscope and gives positional data used in navigation and (optionally) for radio astronomy. The consoles also monitor life support functions, and may connect with instrumentation for checking atmosphere, humidity, and temperature. The consoles also employ a joystick control for the pilot to control direction and amount of levitation and thrust, and for control of weaponry. The weapons can be pre-tested at a low energy level, i.e., by using the maser 56 at a low energy level, for flight check and simulations, and in connection with director stealth functions.

In a preferred mode, the dipoles 40 may have an impedance of 300 ohms. A transistion metal alloy, such as chromium-manganese-antimony may be used in the vehicle hull 12, with the amount of antimony being selected to change the transistion point at which is starts to create a magnetic flux. Common ceramic permanent magnet materials may be used for microwave applications in connection with this invention, such as barium ferrite (oriented), strontium ferrite, yttrium iron garnet, yttrium aluminum, gadolinium garnet, dysprosium (in ferrite). Beryllium aluminum (i.e., 33% aluminum) may be used as a beryllium alloy, as it has a good tensile strength and a high conductivity and high heat capacity, as well as being non-magnetic. Beryllium oxide, which may provide surface insulation, is a good conductor of heat.

The vessel according to this invention provides a clean, economical means for transportation in air or in space, and may be adapted for travel in or under water. The pilot or operator, one inside the vessel, can power up the systems, initiate pre-flight checks, and then use the joystick to engage and initiate flight.

While the invention has been described in reference to a preferred embodiment, it should be understood that the invention is not limited to that precise embodiment. Rather, many modifications and variations will present themselves to those skilled in the art without departing from the scope and spirit of the invention, as defined in the appended claims.

I claim:

1. An aerospace vehicle drive, comprising a hull, said hull having a plurality of layers defining an inter-layer space between two of said layers; a plurality of electromagnetic emitters situated in said inter-layer space; power means within said hull providing electromagnetic energy; and control means for controlling application of said electromagnetic energy to the respective emitters and thus control the net amount and direction of force provided by said drive.

2. The aerospace vehicle drive according to claim 1, wherein said emitters comprise dipole emitters.

3. The aerospace vehicle drive according to claim 1, wherein said hull is configured as a plurality of segments, with each segment having one or more of said emitters.

4. An aerospace vehicle drive comprising a hull, said hull having a plurality of layers defining an inter-layer space between two of said layers; a plurality of electromagnetic emitters situated in said inter-layer space; power means within said hull providing electromagnetic energy; and control means for controlling application of said electromagnetic energy to the respective emitters and thus control the net amount and direction of force provided by said drive, wherein an outer one of said layers has a grooved inner surface.

5. The aerospace vehicle drive according to claim 4, wherein said outer layer is formed of beryllium or titanium.

6. An aerospace vehicle and drive mechanism therefore, comprising a hull having upper and lower hemispheres, each hemisphere being divided into a plurality of segments; a plurality of electromagnetic emitters distributed over the hull such that each of said segments has one or more of said emitters; a source of electromagnetic energy within the hull, and supplying electromagnetic energy to said emitters; and control means for controlling application of said electromagnetic energy to the respective emitters and thus control to the net amount and direction of force provided by said drive.

7. The aerospace vehicle and drive mechanism therefor, according to claim 6, wherein said hull is in the form of a plurality of layers defining an inter-layer space between two of said layers, and wherein at least some of said emitters are situated in said inter-layer space.

8. An aerospace vehicle and drive mechanism therefore, comprising a hull having upper and lower hemispheres, each hemisphere being divided into a plurality of segments; a plurality of electromagnetic emitters distributed over the hull such that each of said segments has one or more of said emitters; a source of electromagnetic energy within the hull, and supplying electromagnetic energy to said emitters; and control means for controlling application of said electromagnetic energy to the respective emitters and thus control the net amount and direction of force provided by said drive; wherein said hull is in the form of a plurality of layers defining an inter-layer space between two of said layers, and wherein at least some of said emitters are situated in said inter-layer space; and wherein an outer layer of said hull has a grooved inner surface.

* * * * *